UNITED STATES PATENT OFFICE.

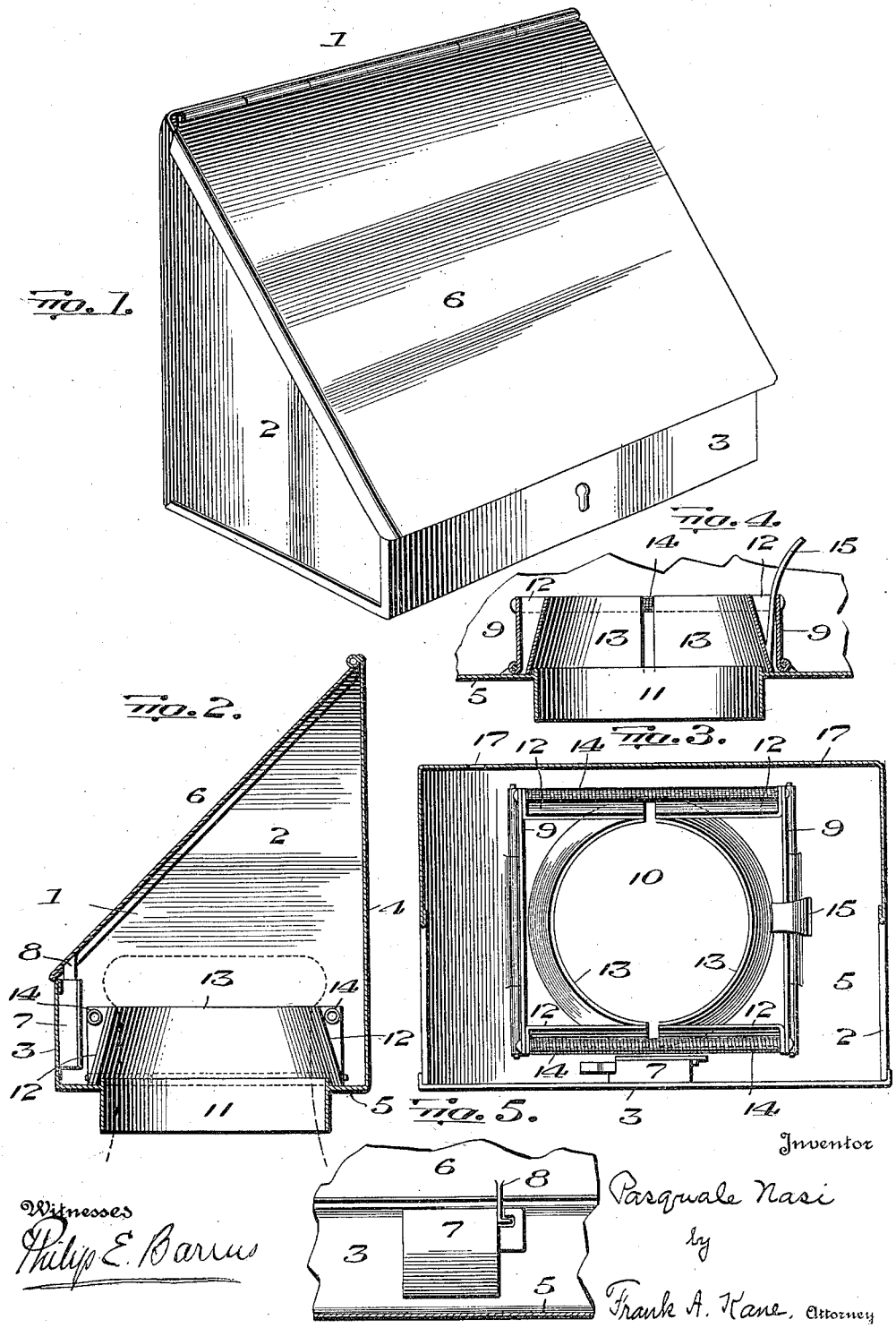

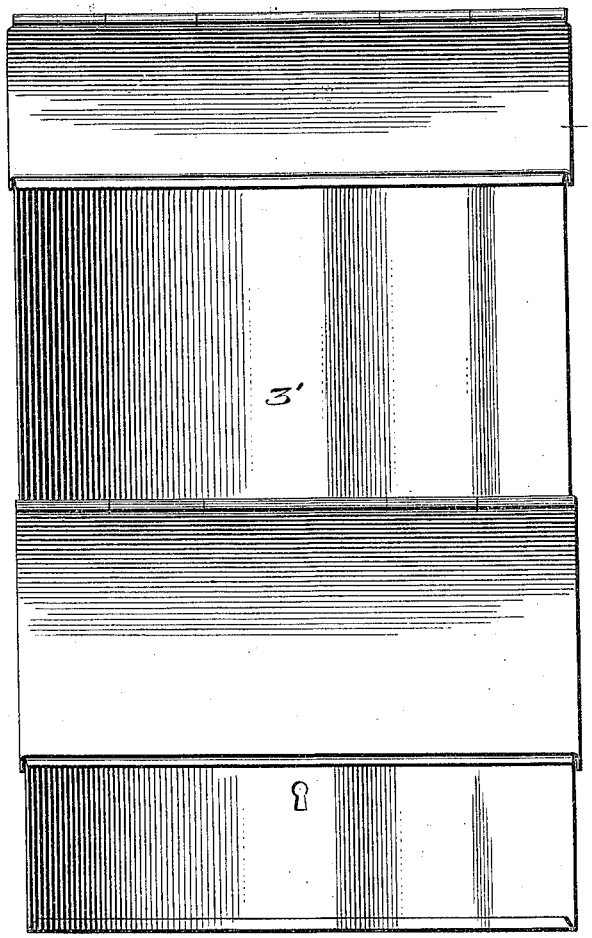
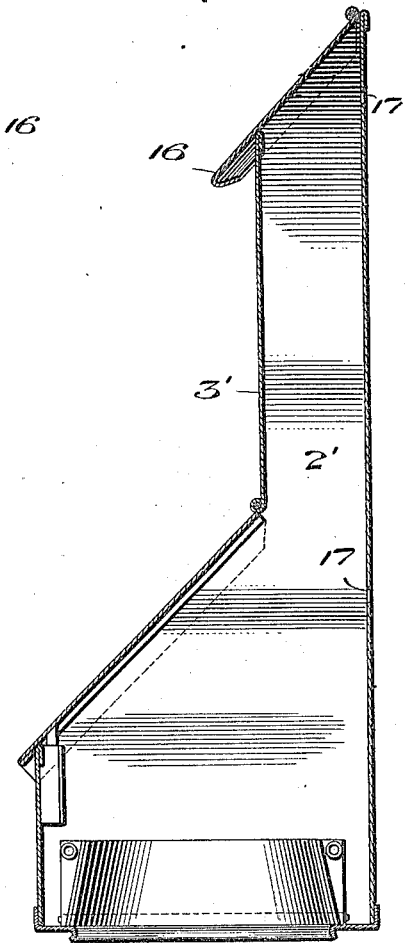

PASQUALE NASI, OF NEW KENSINGTON, PENNSYLVANIA.

MILK-RECEPTACLE.

1,306,971.

Specification of Letters Patent.   Patented June 17, 1919.

Application filed February 2, 1918.   Serial No. 215,064.

*To all whom it may concern:*

Be it known that I, PASQUALE NASI, a subject of the King of Italy, residing at New Kensington, Pennsylvania, have invented certain new and useful Improvements in Milk-Receptacles, of which the following is a specification, reference being had therein to the accompanying drawings.

This invention comprises a milk receptacle. It is contemplated among its objects to provide a simple, neat device for this purpose which may be secured in any convenient locality and into which a milk bottle or the like may be inserted and retained in a safe and sanitary manner, free from theft and pollution.

It is a further object to provide in connection with such a receptacle, a convenient letter box attachment or compartment, the arrangement being such that while the milk and mail may be readily inserted, neither may be removed except by the person who has the key or combination of the locking means which are provided.

Other objects and advantages will in part be apparent and in part be brought out more fully in the description which follows:—

Drawings are appended illustrating certain embodiments of the invention, the following views being shown:

Figure 1, is a view in perspective of one form of the device constituting my invention;

Fig. 2, is a view in vertical section of the same;

Fig. 3, is a view in longitudinal section, the parts being seen from above;

Figs. 4 and 5, are views in fragmentary detail showing certain parts;

Fig. 6, is a view in front elevation of another embodiment; and

Fig. 7, is a view in vertical section of the same.

Referring specifically to these drawings, the numeral 1, designates a receptacle having sides 2, front 3, back 4, bottom 5, and a hinged top 6. The sides are tapered and the front shorter than the back, to provide a triangular cross sectional shape as best seen in Fig. 2. A lock 7 is also provided to engage a locking member 8 on the top, and retain it when in the position shown in Fig. 5.

Within the receptacle there is provided means for engaging the neck of a milk bottle or the like and retaining it against extraction until the cover has been lifted and the locking means released. As here shown such means comprises upstanding supports 9, hingedly connected at one end to the bottom of the receptacle. Between these supports, which are in spaced relation, there is provided an opening 10 in the bottom, and a collar 11 surrounds this opening, the arrangement being such that the neck of a milk bottle may be inserted and fit snugly therein.

Secured to the upstanding supports 9, at each end thereof, there are arms 12, extending toward the opening 10, and to the free ends of these arms are secured semi-circular neck engaging members 13. These members are arranged so that their upper edges are inclined toward each other and at a slight angle to the vertical. Spring members 14 are provided between the supports 9, the arrangement being such that when a bottle is inserted in the opening, the neck engaging members will be permitted to move apart due to the resiliency of the springs, and after the collar or flange on the bottle has passed over the upper edges of these members, they will be drawn into engagement with the neck of the bottle and retain the flange securely as shown in Fig. 2. A handle 15 is provided to withdraw the neck engaging members when it is desired to release the bottle.

In the embodiment illustrated in Figs. 6 and 7, there is provided a portion of the receptacle for the reception of mail and the like. To this end, the back portion is extended upwardly, and a front portion 3' arranged in spaced relation thereto. Extended portions 2' of the sides connected to the front and rear extensions provide an elongated chute upon which there is a hinged cover 16.

For securing the receptacle to any convenient locality the back portion is provided with openings 17.

From the foregoing it will be apparent that the present invention provides a neat, convenient and safe receptacle for the purposes set forth, and while it has been illustrated in the embodiment herein described, it will be understood that I do not wish to be limited to the precise form of this disclosure only in so far as set forth in the claim.

What I claim is:—

A milk receptacle comprising side, end, bottom and top sections joined together, one of said sections being provided with an opening therein; upstanding supporting members hingedly secured to one of the sections in proximity to the opening; spaced-apart arms secured to the upstanding members and extending outwardly in angular relation thereto, said arms having an inward convergence from their bases; neck engaging and confining members associated with the arms and supporting members and having an inward convergence from their bases, said members being arranged in proximity to the opening; and spring members arranged to hold the confining members in engagement with a bottle neck when inserted through the opening.

In testimony whereof I hereunto affix my signature.

PASQUALE NASI.

Copies of this patent may be obtained for five cents each, by addressing the "Commissioner of Patents, Washington, D. C."